(12) United States Patent
Cortright et al.

(10) Patent No.: US 7,214,441 B2
(45) Date of Patent: May 8, 2007

(54) LOW ALKALI SEALING FRITS, AND SEALS AND DEVICES UTILIZING SUCH FRITS

(75) Inventors: Jeffrey Earl Cortright, Corning, NY (US); Lisa Ann Lamberson, Painted Post, NY (US); Pamela Arlene Maurey, Savona, NY (US); Robert Michael Morena, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/051,202

(22) Filed: Feb. 3, 2005

(65) Prior Publication Data

US 2006/0172875 A1    Aug. 3, 2006

(51) Int. Cl.
*H01M 2/08* (2006.01)
*C03C 8/02* (2006.01)

(52) U.S. Cl. .......................... 429/35; 501/15; 501/17; 501/18; 501/21; 501/65; 501/66; 501/68; 501/69; 501/70; 501/72; 501/77

(58) Field of Classification Search ................. 433/30, 433/35; 501/14, 15, 17, 18, 21, 65, 66, 68, 501/69, 70, 72, 77
See application file for complete search history.

(56) References Cited

U.S. PATENT DOCUMENTS

| | | | | |
|---|---|---|---|---|
| 3,501,322 A | * | 3/1970 | Dumbaugh et al. | ........... 501/21 |
| 4,746,578 A | * | 5/1988 | Kondo et al. | ............... 428/432 |
| 5,256,603 A | * | 10/1993 | Andrus et al. | ................ 501/32 |
| 5,273,837 A | * | 12/1993 | Aitken et al. | ................. 429/30 |
| 5,362,687 A | * | 11/1994 | Tokunaga | .................... 501/21 |
| 5,605,869 A | * | 2/1997 | Mangat et al. | ................ 501/14 |
| 5,849,649 A | * | 12/1998 | Poole | .......................... 501/26 |
| 6,271,158 B1 | * | 8/2001 | Xue et al. | ..................... 501/19 |
| 6,291,092 B1 | | 9/2001 | Kohli et al. | .................. 429/33 |
| 6,532,769 B1 | * | 3/2003 | Meinhardt et al. | ........... 65/33.5 |

* cited by examiner

*Primary Examiner*—David Sample
(74) *Attorney, Agent, or Firm*—Svetlana Z. Short

(57) ABSTRACT

A solid oxide fuel cell device incorporates a sealing material resistant to hydrogen gas permeation at a sealing temperature in the intermediate temperature range of 600° C.–900° C., the seal having a CTE in the $100\times10^{-7}/°$ C. to $120\times10^{-7}/°$ C., wherein the sealing material comprises in weight %, of: (i) a 80 wt % to 100 wt % glass frit, the glass frit itself having a composition comprising in mole percent of: $SiO_2$ 15–65; $Li_2O$ 0–5; $Na_2O$ 0–5; $K_2O$ 0–10; MgO 0–5; CaO 0–32; $Al_2O_3$ 0–10; $B_2O_3$ 0–50; SrO 0 to 25, wherein the total amount of alkalis is less than 10 mole %; and
(ii) zirconia or leucite addition 0 wt % to 30 wt.

8 Claims, 2 Drawing Sheets

LOW ALKALI SEALING FRITS, AND SEALS AND DEVICES UTILIZING SUCH FRITS

BACKGROUND OF THE INVENTION

1. Field of the Invention

The present invention relates generally to glass sealing frits such as alkali-zinc-silicate frits. More specifically, these frits are suitable as sealing frits for solid oxide fuel cells (SOFC).

2. Technical Background

Frits which seal in the temperature range of 600° C. to 1000° C. represent an intermediate class of materials between the $B_2O_3$ or $P_2O_5$ based frits used for low temperature sealing of many commercial glass products and the diverse number of silicates utilized for high temperature joining of advanced ceramic, structural components.

The low temperature frits are used at temperatures below 600° C. for sealing products such as cathode ray tubes (CRT), light bulbs and the like. The high temperature frits are used at temperatures above 1000° C. to produce articles which may embody high temperature, fiber reinforced, structural ceramics.

A very old product in the intermediate temperature range (600° C. to 1000° C.) of sealing is $ZnO$—$B_2O_3$—$SiO_2$ frit. Another is $Li_2O$-modified $ZnO$—$Al_2O_3$—$SiO_2$ frit designed for use between 900° C. to 1000° C. Frits that seal in the range between 600° C. and 900° C. are important for many applications. The need for such frits became evident through requests for sealant frits for solid Oxide fuel cells (SOFC).

Furthermore, fuel cell devices undergo large thermal cycling and large thermal gradients, which induces thermal stresses in the fuel cell stack components. Thus the seals need to be able to withstand high temperature fluctuations and have expansion coefficients compatible with electrolyte sheets and frames. If the seal will expand at a rate that is different from the thermal expansion rate of the frame or the electrolyte sheet, it may either crack or cause cracking of the electrolyte sheet. A defect in either the seal or the electrolyte sheet may necessitate a replacement of the electrolyte device.

U.S. Pat. No. 6,291,092 describes the $B_2O_3$-free-frit seals suitable for use in solid oxide. These frit seals had been successfully used in many applications. However, some of the fuel cell devices utilize steel components (e.g., frames or substrates). The frit seals disclosed in Table 1 of U.S. Pat. No. 6,291,092 contain relatively high amounts of ZnO, a compound that could be reduced under appropriate conditions by redox reaction with many stainless steel alloying elements such as Cr and Al.

Thus the need to have alternative frit seal compounds for solid oxide fuel cells has been the subject of considerable amount of research in recent years.

SUMMARY OF THE INVENTION

One advantage of the sealing material of the present invention is that it seals fuel cell device components at temperature ranges (700–900° C.) while having CTEs that are compatible with the CTEs of these components. Another advantage of the sealing material of the present invention is that the resultant seals are durable in the SOFC environments.

According to one aspect of the present invention a solid oxide fuel cell device incorporates a sealing material resistant to hydrogen gas permeation at a sealing temperature in the intermediate temperature range of 700° C.–900° C., the seal having a CTE in the range of $70 \times 10^{-7}$/° C. to $120 \times 10^{-7}$/°C., wherein the sealing material comprises in weight %, of:

(i) a 80 wt % to 100 wt % of glass frit, the glass frit itself having comprising in mole percent of: $SiO_2$ 15–65; SrO 0 to 25; $Li_2O$ 0–5; $Na_2O$ 0–5; $K_2O$ 0–10; MgO 0–5; CaO 0–32; $Al_2O_3$ 0–10; $B_2O_3$ 0–50; wherein the total amount of alkalis is less than 10 mole %; and (ii) a zirconia or leucite mill addition 0 wt % to 30 wt %.

It is preferable that the seal have CTE range of $80 \times 10^{-7}$/° C. to $120 \times 10^{-7}$/° C., more preferably $90 \times 10^{-7}$/° C. to $120 \times 10^{-7}$/° C. and even more preferably $100 \times 10^{-7}$/° C. to $120 \times 10^{-7}$/° C.

According to another aspect of the present invention a solid oxide fuel cell device sealing material comprises frit glass in mole %, of: $SiO_2$ 15–65; $Li_2O$ 0–5; $Na_2O$ 0–5; $K_2O$ 0–5; MgO 0–5; CaO 0–32; $Al_2O_3$ 0–10; $B_2O_3$ 0–45; SrO 10 to 25, wherein the total amount of alkali oxides are less than 10 mole %. According to the embodiments of the present invention this frit glass, when mixed with filler and then fired, forms a seal that is resistant to hydrogen gas permeation at a sealing temperature in the intermediate temperature range of 700° C.–900° C., the seal having a CTE in the $70 \times 10^{-7}$/°C. to $120 \times 10^{-7}$/° C.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
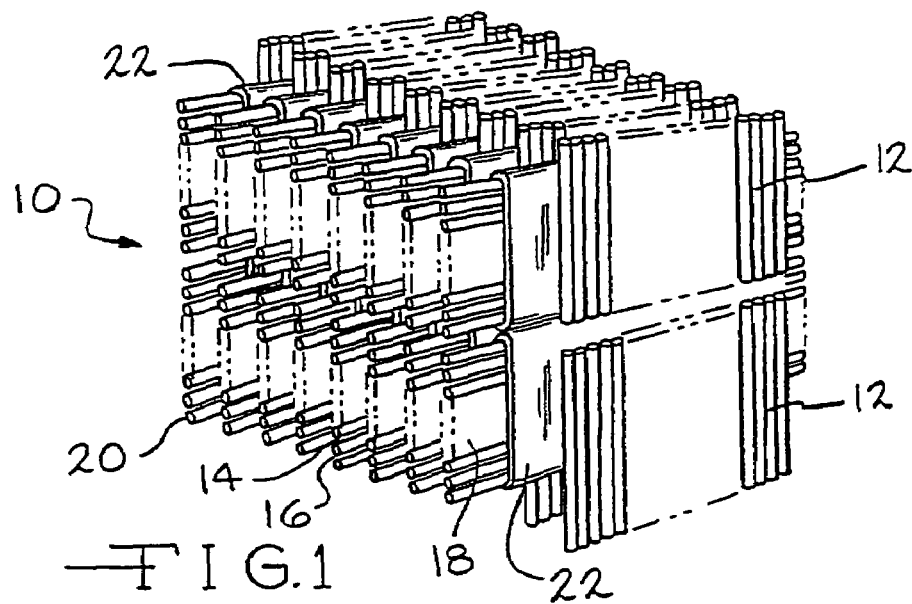
FIG. 1 is a schematic perspective view of an exemplary solid oxide fuel cell device assembly.

Reference will now be made in detail to the present preferred embodiments of the invention, examples of which are illustrated in the accompanying drawings. Whenever possible, the same reference numerals will be used throughout the drawings to refer to the same or like parts. The solid oxide fuel cell (SOFC) device is designated generally throughout by the reference numeral 10.

Figure 2:
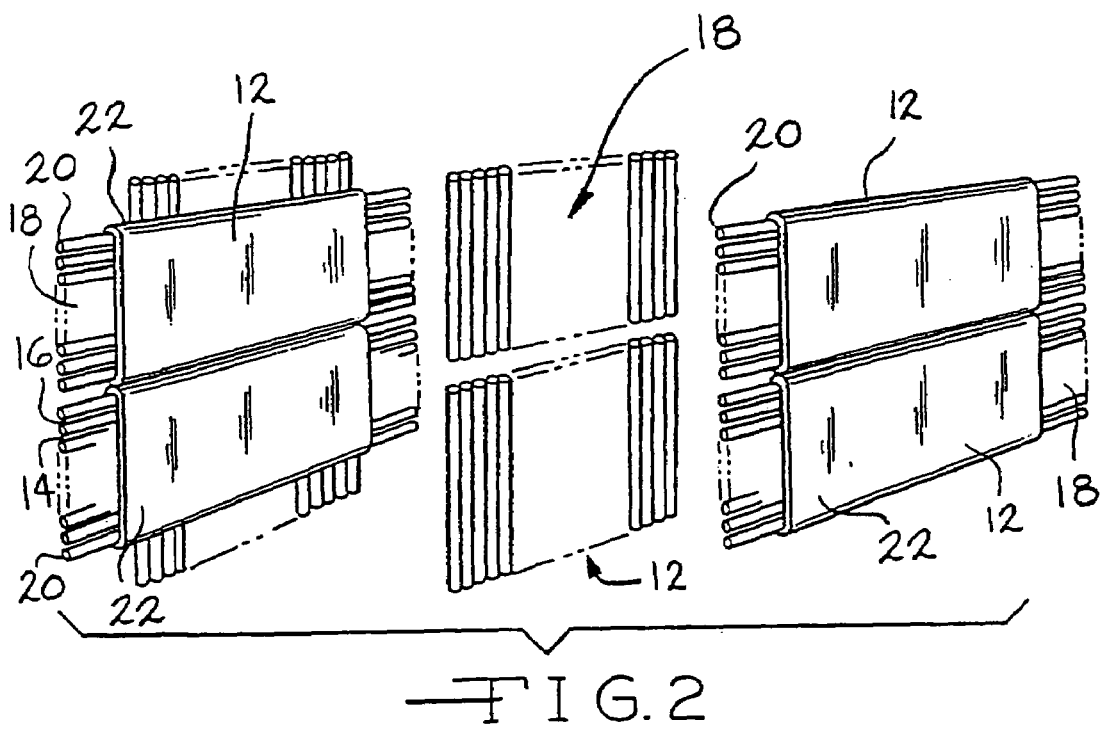
FIG. 2 is an exploded, perspective view of a portion of the solid oxide fuel cell device assembly of FIG. 1.

FIG. 1 is a perspective view of a typical SOFC device assembly 10. FIG. 2 illustrates a portion of the fuel cell device assembly 10, including stacked fuel cell devices 12. The SOFC device assembly 10 include alternating fuel cell devices, each composed of layers of a solid electrolyte, cathode and anode plates. The solid electrolyte generally is yttrium (Y)-doped $ZrO_2$. Fuel cell devices 12 include anodes 14, cathodes 16 and an electrolyte (not shown). Each fuel cell device 12 also comprises distribution member 18 which embodies a plurality of parallel passages 20 for the supply of electrolyte, oxidant or fuel. The axes of passages 20 lie in a common plane.

Distribution member 18 is preferably manufactured from two corrugated, ceramic plates. The corrugations of the plates are arranged parallel, and the troughs of one of the plates are bonded to the peaks of the other plate. This forms passages 20 which have a diameter on the order of 2 mm.

As shown in FIG. 2, porous support structure 22 surrounds and extends transversely of distribution member 18. It contacts the peaks and the troughs of member 18 to form a plurality of parallel passages which are anode 14 or cathode 16 chambers of solid oxide fuel cell devices 12. They provide the distribution and removal of the electrolyte for solid oxide fuel cell devices 12. The corrugated ceramic plates have apertures between passages 20 to allow fuel to flow from passages 20 into anode 14 or cathode 16 chambers of solid oxide fuel cell devices 10.

Figure 3:
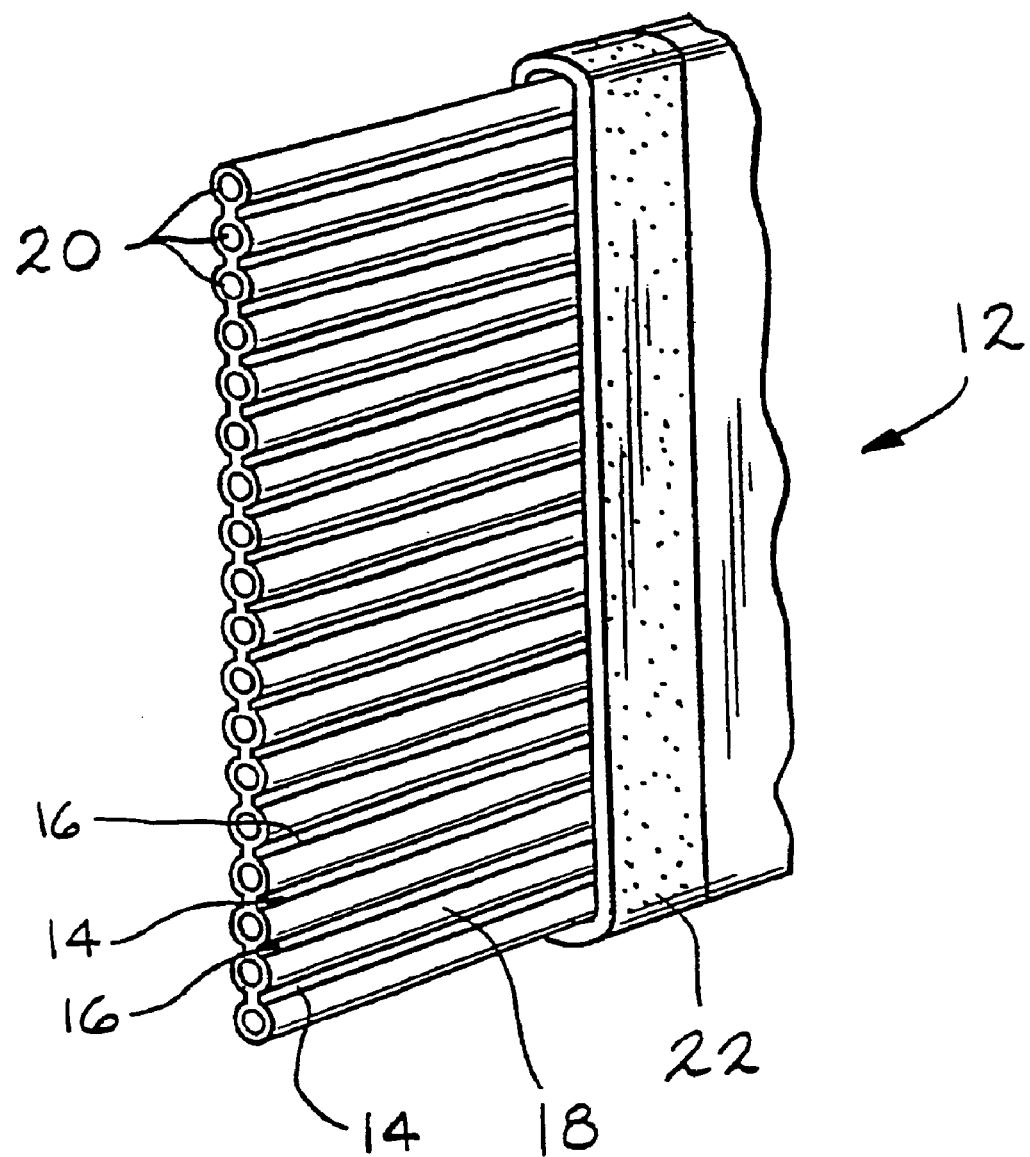
FIG. 3 is a perspective view of an exemplary fuel cell device.

FIG. 3 is an exploded, fragmentary view showing alternating anodes 14 and cathodes 16 and their relationship to passages 20.

The glass-frit-based seals of this invention may encapsulate each cell 12, or they may form a barrier between each cell 12. When forming a barrier, the glass-frit-based seals may take the form of a plate sandwiched between adjacent cells 12. Structure 22 also may be made of the glass frits of this invention. The glass-frit-based seals prevent hydrogen gas from diffusing from one cell 12 to another. The glass-frit-based seals may be used in SOFC devices with different architecture than that shown in FIGS. 1–3, any place where one or more SOFC device components need to be sealed to another component.

According to an embodiment of the present invention the solid oxide fuel cell device 10 incorporates a sealing material resistant to hydrogen gas permeation at a sealing temperature in the intermediate temperature range of 700° C.–800° C. The sealing material has a CTE in the $70 \times 10^{-7}/°$ C. to $120 \times 10^{-7}/°$ C. The sealing material comprises sealing glass frit in 80 to 100 weight %, and mill addition (for example, zirconia mill or leucite mill addition) 0 wt % to 30 wt %, such that total wt % of glass frit and the mill addition is 100 wt %. It is preferable mean particle size of the addition be less than 20 μm, more preferably less than 5 μm.

The sealing glass frits of this invention have relatively small amount of alkalis. More specifically the amount of alkali in the glass frit composition according to the present invention is less than 10 mole % and preferably less than 5 mole %. Preferably, the sealing glass frit contains no ZnO. Preferably, the sealing glass fit contains no ZnO because of the tendency for ZnO to be reduced in $H_2$ environments.

According to some embodiments of the present invention the glass frits have the following composition in mole percent: $SiO_2$ 15–65; SrO 0 to 25; $Li_2O$ 0–5; $Na_2O_3$ 0–5; $K_2O$ 0–10; MgO 0–5; CaO 0–32; $Al_2O_3$ 0–10; $B_2O_3$ 0–50; wherein the total amount of alkalis is less than 10 mole %. Preferably total glass formers (i.e., $B_2O_3+SiO_2$) should be in the range 50–75 mole %, preferably 60–70 mole %. If the glass frit material contains ZnO; $ZrO_2$ and/or $TiO_2$, than preferably the total amount of ZnO; $ZrO_2$ and/or $TiO_2$ is less than 5 mole %, and more preferably less than 2 mole %.

According to some embodiments the glass frit is strontium borosilicate glass that comprises in mole percent: $SiO_2$ 55–65; SrO 10 to 25; $Li_2O$ 0–5; $Na_2O_3$ 0–5; $K_2O$ 0–10; MgO 0–5; CaO 0–10; $Al_2O_3$ 0–10; $B_2O_3$ 0–20; wherein the total amount of alkalis is less than 10 mole %. It is preferable that this strontium borosilicate glass comprises in mole %: CaO 0–5%, $B_2O_3$ 5–15%, $K_2O$ 0–5%, $Al_2O_3$ 0–5%, MgO be less than 1%, and SrO 15 to 20%. These strontium borosilicate glasses have softening points about 725° C., and CTEs about $90 \times 10e-7/°$ C. Because of the relatively low CTEs, it is preferable to use these frit glass compositions in conjunction with an expansion-modifying (raising) filler. For example, 10–20 wt % of a high CTE filler such as Ca-stabilized zirconia, or Y-stabilized zirconia (YSZ) are added to the glass frit (80–90 wt %) in order to raise CTEs of the resultant glass blend to the desired level of about 100 to $120 \times 10-7/°$ C.

The seal materials formed of the strontium borosilicate glass frit/filler blends described above partially-devitrify during the initial sealing cycle (800–850° for 1–5 hours) to form a strontium alumino-silicate crystalline phase and at least one additional crystalline phase. It is preferable that the strontium borosilicate frit glass composition include lithia to maintain the relatively-high CTE, because its omission results in a lowering of the frit's CTE (from $85–90 \times 10e-7/°$ C. to $65–70 \times 10e-7/°$ C.). The preferred amount of $Li_2O$ in the glass composition is 1 to 4 mole %. It is preferable that the glass frit contain calcia. The preferred amount of calcia is 5 to 10 mole %. Calcia helps to maintain the CTE during extended aging, since lithia-containing frits may form a low CTE stuffed quartz phase and result in a drop in CTE upon air-aging (typically 100 hrs at 725°) from $85 \times 10e-7/°$ C. to $60–65 \times 10e-7/°$ C. The alumina level ($Al_2O_3$) should ideally be kept low, preferably in a 2 to 5 mole % range, otherwise (Al+3+Li+1) replacement of Si+4 is possible, leading to the low CTE phase, stuffed β-quartz.

According to other embodiments the glass frit is calcium silico-borate glass frit that comprises in mole percent: $SiO_2$ 20–30; SrO 0–10; $K_2O$ 0–8; MgO 0–6; CaO 20–30; $Al_2O_3$ 0–10; $B_2O_3$ 35–45; wherein the total amount of alkali is less than 10 mole %. It is preferable that the amount of: CaO 22–25 mole %, $B_2O_3$ 38–42 mole %, $K_2O$ 0–6 mole %, $Al_2O_3$ 2–5 mole %, MgO less than 1 mole %, and SrO 0 to 3 mole %. These calcium silico-borate glass fits are different from the strontium boro-silicate glass frits because they contain higher amount of $B_2O_3$, lower amount of $SiO_2$ and lower amount of SrO. The small amount of SrO results in a better flowing, more stable frit. This type of frit glass may also contain a small amount of other alkali than those listed above, for example, $Li_2O$ and/or $Na_2O_3$. However, the total amount of alkali in the silico-borate glass frit of this type is less than 10 mole %, preferably less than 8 mole % and more preferably less than 5 mole %. The calcium silico-borate glass frit may be completely alkali free.

EXAMPLES

The sealing blend of this invention will be further clarified by the following examples, showing glass frit composition in mole percent and the total blend composition (glass frit and filler) in wt %.

TABLE 1

| Frit | General Category | Base glass:filler ratio (wt basis) | Composition (mole %) | | Physical properties |
|---|---|---|---|---|---|
| | | | Base glass | Filler | |
| Example 1 | Low alkali | 90:10 | $Li_2O$ 4.0 | Y stabilized zirconia: | CTE = 117.8 × 10e-7/° C. |
| | | | CaO 7.0 | 8% $Y_2O_3$ | Soft. pt = 767° C. |
| | | | SrO 18.0 | 92% $ZrO_2$ | Sealing temp = 850° C. |

TABLE 1-continued

| Frit | General Category | Base glass:filler ratio (wt basis) | Composition (mole %) Base glass | | Filler | | Physical properties |
|---|---|---|---|---|---|---|---|
| | | | $Al_2O_3$ | 3.0 | or | | |
| | | | $B_2O_3$ | 10.0 | Ca stabilized zirconia: | | |
| | | | $SiO_2$ | 58.0 | 12% CaO | | |
| | | | | | 88% $ZrO_2$ | | |
| Example 2 | Low alkali/low silica | 100:0 (no filler) | $K_2O$ | 6.0 | (none) | | CTE = 100.8 × 10e-7/° C. Sealing temp = 850° C. |
| | | | SrO | 0 | | | |
| | | | CaO | 22.7 | | | |
| | | | $Al_2O_3$ | 4.0 | | | |
| | | | $B_2O_3$ | 40.5 | | | |
| | | | $SiO_2$ | 26.8 | | | |
| Example 3 | Low alkali/low silica | 80:20 | $K_2O$ | 6.0 | Ca stabilized zirconia: | | Sealing temp = 850° C. |
| | | | SrO | 0 | CaO | 12.0 | |
| | | | CaO | 22.7 | $ZrO_2$ | 88.0 | |
| | | | $Al_2O_3$ | 4.0 | | | |
| | | | $B_2O_3$ | 40.5 | | | |
| | | | $SiO_2$ | 26.8 | | | |
| Example 4 | Low alkali/low silica | 80:20 | $K_2O$ | 6.0 | Leucite | | Sealing temp = 850° C. |
| | | | SrO | 0 | $K_2O$ | 16.7 | |
| | | | CaO | 22.7 | $Al_2O3$ | 16.7 | |
| | | | $Al_2O_3$ | 4.0 | $SiO_2$ | 66.6 | |
| | | | $B_2O_3$ | 40.5 | | | |
| | | | $SiO_2$ | 26.8 | | | |
| Example 5 | No alkali/low silica | 100:0 (no filler) | SrO | 3.0 | (none) | | CTE = 71.0 × 10e-7/° C. Sealing temp = 850° C. |
| | | | CaO | 29.5 | | | |
| | | | $Al_2O_3$ | 4.0 | | | |
| | | | $B_2O_3$ | 40.5 | | | |
| | | | $SiO_2$ | 26.8 | | | |
| Example 6 | No alkali/low silica | 80:20 | SrO | 3.0 | Ca stabilized zirconia | | Sealing temp = 850° C. |
| | | | CaO | 29.5 | CaO | 12.0 | |
| | | | $Al_2O_3$ | 4.0 | $ZrO_2$ | 88.0 | |
| | | | $B_2O_3$ | 40.5 | | | |
| | | | $SiO_2$ | 26.8 | | | |

The data shown in Table 1 illustrates six exemplary low alkali (or no alkali) boron silica glass frit compositions and their associated fillers. More specifically, these frits are alkaline earth borosilicate or silico-borate frit glasses. After melting, each glass frit composition was made into frit by dry ball-milling to a mean particle size of less than 30 μm, for example, 5.0 μm to 20 μm. The high CTE values and the high softening point required for SOFC sealing material of examples 1, 3, 4, and 6 are met by adding an expansion coefficient raising filler to the relatively high viscosity vitreous powdered base glass. Exemplary fillers are stabilized zirconia (CTE≈20×10$^{-7}$/° C.) or leucite K$_2$O.Al$_2$O$_3$.4SiO$_2$ (CTE≈200×10$^{-7}$/° C.) addition, 5 wt % to 30 wt %, preferably 5 to 20 wt %. The second and fifth examples required no filler.

Example 1 frit glass is essentially a devitrifying glass, preferably with approximately 20–50 volume % crystalline phase. The blend contains 10 wt % of a stabilized zirconia filler to increase CTE. The glass frit formed by the first exemplary glass composition shown in Table 1 has a softening point at about 770° C. and a sealing temperature at about 850° C.

The second example in Table 1 corresponds to a completely devitrifying glass-ceramic frit. The frit has a smaller amount of $SiO_2$, and a larger amount of CaO and $B_2O_3$ than the preceding example. The glass seal formed by the second exemplary glass composition shown in Table 1 has a lower CTE value than that of example 1, since no filler was added. Despite the relatively-low CTE, the frit exhibited good adhesion to the different fuel cell components.

The composition of the third example contains an identical base glass as example 2, but also includes a stabilized zirconia filler to increase CTE.

The seal material of the fourth example utilizes the frit glass of the third example, but with a leucite filler. It has a sealing temperature of about 850° C.

The fifth example utilizes a frit glass that is completely alkali-free. Although the CTE is relatively-low since no filler is used, the frit displayed excellent bonding properties to the various fuel cell components.

The sealant material of the sixth example utilizes a glass frit that is similar to the glass of the fifth example, but with a filler to raise CTE. It has a sealing temperature of about 850° C.

Sealant Blends.

The sealing material comprises alkaline earth-silica-based glass frits in 80 to 95 weight %, and mill addition 5 wt % to 30 wt %, preferably 10 to 30 wt %, such that total wt % of glass frit and the mill addition is 100 wt %. It is preferable that the a mean particle size of the addition be less than 30 μm, more preferably less than 20 μm and even more preferably less than 5 μm.

All five blends produced a seal at the sealing temperature of less than 1000° C., preferably at 700° C. to 900° C. The unfilled glass produced lowest seal CTE values. Thus, if higher seal CTE values are required, some filler mill addition may also be added to the mix, in the amount required to raise the CTE of the resultant blend to the required levels.

The glass frit/leucite blend of example 4 had only 20% leucite by wt. Although finely-powdered natural leucite could be used to make this blends, in this exemplary embodiment the leucite source that was added in order to rise the CTE value of the resultant seal was a glass-ceramic (composition in mole %: $Na_2O_3$ 4.7; $K_2O$ 13.0; $Al_2O_3$ 18.0; $SiO_2$ 59.1; $TiO_2$ 5.1). After this (glass-ceramic) composition was melted at the temperatures between 1600° C. to 1650°

C., the resultant material was ceramed at 1100° for four hours and then ball-milled to a mean particle size of 10–20 μm.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A solid oxide fuel cell device incorporates a sealing material resistant to hydrogen gas permeation at a sealing temperature in the intermediate temperature range of 700° C.–900° C., the seal having a CTE in the range of $70\times10^{-7}/°$ C. to $120\times10^{-7}/°$ C., wherein the sealing material comprises in weight %, of:
   (i) a 70 wt % to 100 wt % of glass frit, the glass frit itself having a composition comprising in mole percent of: $SiO_2$ 15–65; $Li_2O$ 0–5; $Na_2O$ 0–5; $K_2O$ 0–10; MgO 0–5; CaO 0–32; $Al_2O_3$ 0–10; $B_2O_3$ 0–50; SrO 0 to 25, but no BaO, $Y_2O_3$, or $La_2O_3$, or other lanthanides, wherein the total amount of alkali is less than 10 mole %; and
   (ii) zirconia or leucite addition 0 wt % to 30 wt %.

2. The solid oxide fuel cell device according to claim 1, wherein the glass frit itself having a composition in mole percent of:

| | |
|---|---|
| $SiO_2$ | 55–65 |
| $Al_2O_3$ | 0–10 |
| $Na_2O$ | 0–5 |
| $K_2O$ | 0–10 |
| $B_2O_3$ | 0–20 |
| $Li_2O$ | 0–5 |
| $K_2O$ | 0–2, |
| SrO | 0–25 |
| CaO | 0–32, and | said composition includes a 80 wt % to 100 wt % of glass frit and zirconia or leucite addition 0 wt % to 20 wt %.

3. The solid oxide fuel cell device according to claim 2 comprising 5 to 20 wt % of zirconia or leucite addition having mean particle size of less than 20 μm.

4. The solid oxide fuel cell device according to claim 1, wherein the glass frit composition comprises in mole %:

| | |
|---|---|
| $SiO_2$ | 20–30 |
| CaO | 22–25 |
| $Al_2O_3$ | 1–3 |
| $B_2O_3$ | 30–50 |
| $Na_2O$ | 0–5 |
| $K_2O$ | 0–8 |
| SrO | 0–15 |
| MgO | 0–1, and | said composition includes a 80 wt % to 100 wt % of glass frit and zirconia or leucite addition 0 wt % to 20 wt %.

5. The solid oxide fuel cell device according to claim 4, wherein the amount of ZnO in the glass frit is less than 1 mole %.

6. The solid oxide fuel cell device according to claim 1, wherein the glass frit itself has the composition in mole %:

| | |
|---|---|
| $SiO_2$ | 20–30 |
| CaO | 20–30 |
| $Al_2O_3$ | 1–5 |
| $Na_2O$ | 0–5 |
| $K_2O$ | 0–8 |
| SrO | 0–15 |
| MgO | 0–1. |

7. The solid oxide fuel cell device according to claim 1, wherein the total amount of $SiO_2$ and $B_2O_3$ in the glass frit itself is 50 to 75 mole %.

8. The solid oxide fuel cell device according to claim 1, wherein the total amount of $SiO_2$ and $B_2O_3B_2O_3$ in the glass frit itself is 60 to 70 mole %.

* * * * *